United States Patent [19]

Hillman

[11] 3,724,875
[45] Apr. 3, 1973

[54] SAFETY CABLE FOR TRAILER HITCH
[76] Inventor: Arnold R. Hillman, 25821 Telegraph Rd., Flat Rock, Mich. 48134
[22] Filed: Dec. 30, 1971
[21] Appl. No.: 214,356

[52] U.S. Cl. .............................280/457, 280/446 B
[51] Int. Cl. .............................................B60d 1/12
[58] Field of Search.............280/457, 446 B, 446 R

[56]  References Cited
UNITED STATES PATENTS

| 1,434,512 | 11/1922 | Thoennes | 280/446 B UX |
| 2,788,990 | 4/1957 | Barcafer | 280/457 |
| 3,123,383 | 3/1964 | Humpal | 280/457 |
| 3,265,407 | 8/1966 | Paddock | 280/457 |
| 3,471,170 | 10/1969 | Rendessy | 280/457 X |

Primary Examiner—Leo Friaglia
Attorney—A. Yates Dowell, Jr.

[57]  ABSTRACT

Safety auxiliary apparatus for connecting a towed vehicle to a propelling vehicle in which the primary connection is a conventional trailer hitch. The safety auxiliary apparatus includes means on the trailer tongue providing a connection to the propelling vehicle so that the trailer will remain under control in the event that the primary hitch becomes disengaged.

5 Claims, 3 Drawing Figures

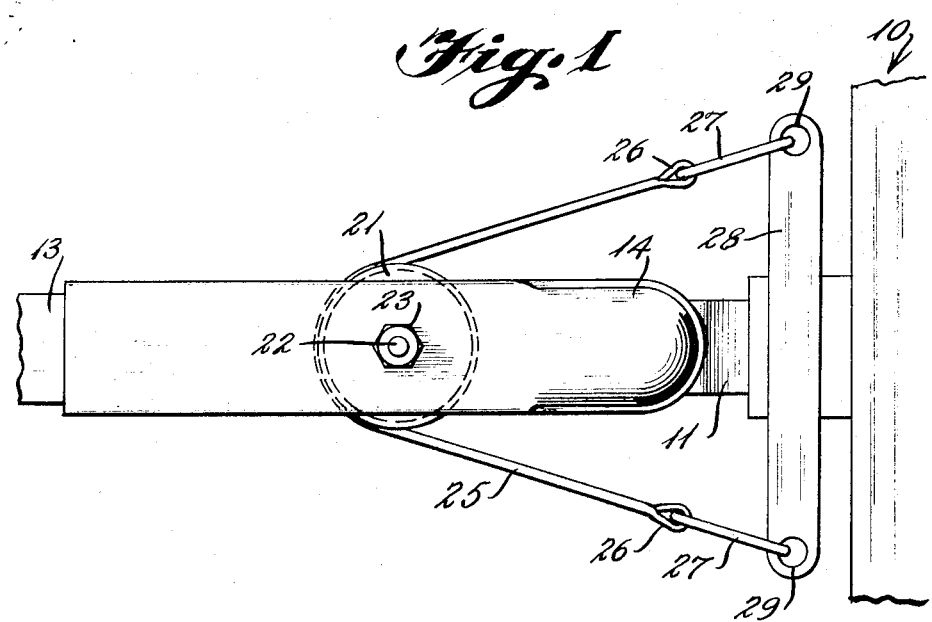
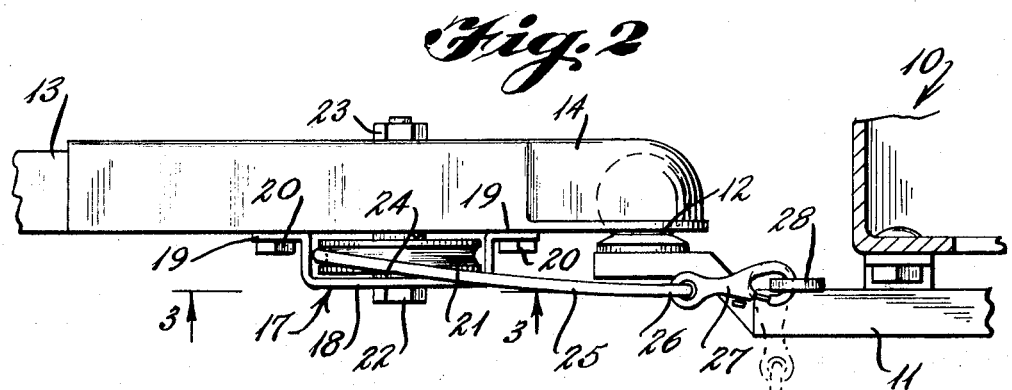
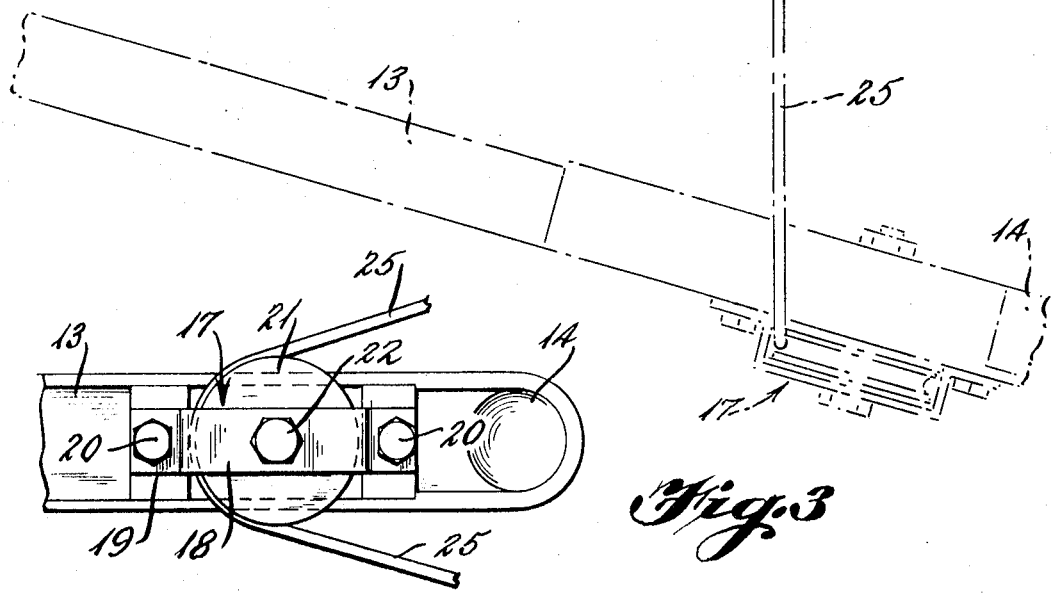

SAFETY CABLE FOR TRAILER HITCH

BACKGROUND OF THE INVENTION

1. Field of the Invention

This invention relates generally to automotive accessories of various kinds and relates particularly to apparatus for connecting a towed vehicle to a propelling vehicle to prevent separation of the vehicles in the event that the trailer hitch becomes disengaged.

2. Description of the Prior Art

Heretofore many devices have been provided for connecting a towed vehicle to a propelling vehicle and most of these devices have included a ball and socket type hitch which permits the towed vehicle to track easily behind the propelling vehicle. In cases where the towed vehicle or trailer has included a single axle with one or more wheels on each side of the vehicle, the load factor of the trailer has been somewhat critical and should be arranged so that the center of gravity is slightly forward of the trailer axle. With this arrangement most of the weight of the trailer is supported by the trailer wheels with some weight being transferred to the propelling vehicle through the hitch. In loading the trailer, if too much weight is shifted forwardly, an excessive amount of weight is transferred to the propelling vehicle and the propelling vehicle becomes sluggish and difficult to manage. If most of the weight carried by the trailer is shifted rearwardly of the axle, an upward force is applied to the trailer hitch tending to cause the socket of the trailer tongue to separate from the ball of the propelling vehicle, as well as to lift the rear of such propelling vehicle. Most ball and socket type hitches have a locking arrangement of some kind; however, most locking arrangements extend only a short distance below the center of the ball and are controlled by a leverage which is supposed to prevent separation of the units.

Many times the trailer hitch has failed while the vehicles were in motion and when this occurred the trailer became separated from the propelling vehicle and was an unguided free rolling mass which collided with fixed objects and created a substantial amount of damage. For this reason, the highway divisions of most states have required that towed vehicles or trailers be equipped with safety chains connecting the towed vehicle to the propelling vehicle in areas spaced from the trailer hitch so that in the event the trailer hitch fails, the trailer will remain connected to the propelling vehicle.

The use of safety chains has not been entirely satisfactory due to the fact that the center of rotation between the towed vehicle and the propelling vehicle is at the ball and socket joint and therefore it has been necessary to locate the safety chains adjacent to the trailer hitch and provide a substantial amount of slack in the safety chains to permit the vehicles to turn relative to each other. Even with the safety chains, when the weight on the towed vehicle or trailer is forwardly of the axle and the trailer hitch becomes disengaged, the tongue has dropped to the ground or the roadway and created considerable damage thereto. Also when the propelling vehicle has stopped to reconnect the trailer hitch, the tongue of the trailer has passed under the propelling vehicle and the trailer has crashed into the rear thereof creating more damage to the trailer and to the propelling vehicle. When the weight of the trailer has been located rearwardly of the axle when the trailer hitch became disconnected, the trailer merely pivoted about the axle so that the rear of the trailer engaged the roadway and caused damage to the trailer and road surface.

Some efforts have been made to provide trailer hitches and safety connections for attaching a towed vehicle to a propelling vehicle which permits relative swinging movement between the propelling and towed vehicles, such as the U.S. Pat. to Musslewhite Nos. 1,821,395 and Rendessy 3,471,170. Also, some efforts have been made to provide means for supporting the trailer tongue in the event that the hitch became disengaged, such as the U.S. Pat. to Vogel No. 2,554,801.

SUMMARY OF THE INVENTION

The present invention is a safety cable for a trailer hitch which includes a pulley supported by a bracket carried by the tongue of the trailer, and such pulley is adapted to engage the intermediate portion of a cable the opposite ends of which are connected to fixed structure on the propelling vehicle. The pulley and bracket are mounted adjacent to the ball and socket hitch to permit relative free swinging movement between the trailer and the propelling vehicle, as well as to support the tongue of the trailer in the event that the trailer hitch becomes disengaged. Also the cable will function as a stop when the trailer tongue passes under the propelling vehicle and will prevent the trailer from colliding with the propelling vehicle when the latter is stopped.

It is an object of the invention to provide a safety cable for a trailer hitch including a bracket mounted pulley located adjacent to the hitch between the trailer and the propelling vehicle and adapted to support the tongue of the trailer if the hitch should become disengaged.

BRIEF DESCRIPTION OF THE DRAWING

FIG. 1 is a top plan view illustrating one application of the hitch.

FIG. 2 is a side elevation thereof.

FIG. 3 is a bottom plan view.

DESCRIPTION OF THE PREFERRED EMBODIMENT

With continued reference to the drawing, a propelling vehicle 10 is provided with a hitch mounting bracket 11 fixed to the frame and undercarriage thereof and such hitch mounting bracket includes a ball 12 spaced rearwardly from the vehicle. A towed vehicle, such as a luggage trailer, camping trailer, or the like (not shown), is provided with a tongue 13, the front end of which includes a socket 14 of a size to receive the ball 12. Preferably locking mechanism (not shown) is mounted within the socket 14 and is operable to lock the ball and socket together to prevent vertical movement and disengagement while permitting horizontal swinging motion between the ball and socket. The structure thus far described is conventional in the prior art and forms no part of the present invention, it being understood that any conventional hitch connection, such as a vertical pin extending through a clevis, could be utilized to connect the propelling vehicle to the towed vehicle in a manner to permit relative swinging motion in a horizontal direction.

In order to provide a safety cable for connecting the towed vehicle or trailer to the propelling vehicle, a bracket 17 having a U-shaped central portion 18 with outwardly extending flanges 19 is connected to the bottom of the tongue 13 in any desired manner, as by fasteners 20 extending through the flanges 19 into the tongue 13. If desired, the fasteners 20 could be omitted and the bracket could be welded or otherwise permanently attached to the tongue of the trailer. Within the U-shaped portion 18, a pulley or sheave 21 is rotatably mounted on an axle forming bolt 22 which extends through an opening in the U-shaped portion of the bracket and through the tongue 13 and is clamped in fixed position by a nut 23. Preferably the sheave 21 is spaced from the U-shaped portion 18 of the bracket and the tongue 13 by low friction spacers 24 constructed of any desired material, such as sintered oilite bronze, nylon, Teflon, or the like.

A cable or other flexible member 25 is disposed about the sheave 21 and within the bracket 17 and such cable has a loop or eye 26 at each end which is connected to a snap hook 27. Opposite ends of the cable 25 are adapted to be connected to fixed structure on the propelling vehicle and in order to do this an anchor plate 28 having openings 29 in opposite ends is welded or otherwise fixed to the hitch mounting bracket 11 or to other fixed structure on the propelling vehicle. The snap hooks 27 on the ends of the cable 25 are adapted to be connected to the anchor plate 28 through the openings 29.

In the operation of the device, when the ball 12 and socket 14 are in assembled relation, the snap hooks 27 on opposite ends of the cable 25 are connected to the anchor plate 28. When the propelling vehicle maneuvers or turns a corner, the tongue 13 swings about the ball and socket connection so that the trailer will track behind the propelling vehicle. During this horizontal swinging movement between the propelling vehicle and the trailer, the cable 25 causes the sheave 21 to rotate so that the sheave is closer to one end of the cable than the other. Due to the short length of the cable, as well as the location of the sheave 21 adjacent to the ball 12, little slack will be required in the overall length of the cable.

If the ball and socket should accidentally become disengaged and the trailer tongue 13 separated from the propelling vehicle, the end of the tongue with the socket 14 would tend to fall by gravity to the roadway and under normal circumstances when travelling on a level road or going uphill, the trailer would begin to stop. As soon as separation between the ball and socket occurs, a strain is applied to the cable 25 so that the trailer continues to be connected to the propelling vehicle. Under these conditions, the swinging motion of the trailer indicates to the operator of the propelling vehicle that the trailer hitch has become disengaged. When the operator of the propelling vehicle applies his brakes, the propelling vehicle will be travelling more slowly than the towed vehicle, therefore, the tongue 13 will pass under the propelling vehicle. However, the cable 25 will support the tongue so that it does not engage the road Continued braking action of the propelling vehicle will permit the trailer tongue to move under the vehicle until the strain again is taken on the cable 25 so that the cable will act as a brake for the trailer and prevent the trailer from crashing into the propelling vehicle.

Some larger trailers are provided with electrically operated brakes which are applied automatically when the brakes of the propelling vehicle are applied. The electrical system of the trailer which controls the electrically operated brakes, as well as the lights on the trailer, is connected to the electrical system of the propelling vehicle and such connection normally is through a separable male and female plug located adjacent to the ball and socket. When the ball and socket become disengaged, the male and female plug will become separated so that the trailer loses all electrical power and the trailer brakes cannot be operated. When this occurs, the cable 25 becomes the sole braking force for the trailer and stops the trailer when the propelling vehicle is stopped with little or no damage to either vehicle.

I claim:

1. Apparatus for connecting the tongue of a towed vehicle to a propelling vehicle comprising the combination of a hitch connection and an auxiliary safety cable means, said hitch connection including a mounting bracket fixed to said propelling vehicle, ball means carried by said mounting bracket, socket means mounted on the tongue of the towed vehicle, said socket means adapted to cooperatively receive said ball means and provide the primary hitch connection between said propelling and towed vehicles, said auxiliary safety cable means including a generally vertical axle carried by said tongue, sheave means freely rotatably mounted on said axle, cable means having a central portion cooperatively engaging said sheave means, anchor means fixed to said propelling vehicle, connecting means on opposite ends of said cable means for connecting said cable means to said anchor means, and said cable means being of a length to support the tongue of said towed vehicle above the ground if the ball and socket hitch connection becomes accidentally disengaged.

2. The structure of claim 1 in which said cable connecting means includes hook means at each end of said cable means.

3. The structure of claim 1 including U-shaped bracket means mounted on said tongue, and one end of said axle being supported by said U-shaped bracket.

4. In a hitch connection for connecting the tongue of a towed vehicle to a propelling vehicle, the improvement comprising an auxiliary safety cable apparatus including a U-shaped bracket mounted on said tongue adjacent to said hitch connection, sheave means freely rotatably mounted on said bracket, cable means having an intermediate portion cooperatively engaging said sheave means, anchor means mounted on said propelling vehicle, hook means connected to opposite ends of said cable means and adapted to connect said cable means to said anchor means, and said cable means being of a length to support the tongue of said towed vehicle if the hitch connection becomes accidentally disengaged.

5. The structure of claim 4 in which said sheave means is located between a portion of said U-shaped bracket and said tongue, and the central portion of said cable means is confined within said U-shaped bracket.

* * * * *